US009117168B2

(12) United States Patent
Ahn et al.

(10) Patent No.: US 9,117,168 B2
(45) Date of Patent: Aug. 25, 2015

(54) APPARATUS AND METHOD FOR CALCULATING INTERNAL STATE FOR ARTIFICIAL EMOTION

(71) Applicant: KOREA INSTITUTE OF INDUSTRIAL TECHNOLOGY, Chungcheongnamdo (KR)

(72) Inventors: Ho Seok Ahn, Incheon (KR); Dong Wook Lee, Incheon (KR)

(73) Assignee: KOREA INSTITUTE OF INDUSTRIAL TECHNOLOGY, Cheonan (KR)

(*) Notice: Subject to any disclaimer, the term of this patent is extended or adjusted under 35 U.S.C. 154(b) by 302 days.

(21) Appl. No.: 13/630,224

(22) Filed: Sep. 28, 2012

(65) Prior Publication Data
US 2014/0095570 A1    Apr. 3, 2014

(51) Int. Cl.
*G06N 3/00* (2006.01)
(52) U.S. Cl.
CPC ..................................... *G06N 3/004* (2013.01)
(58) Field of Classification Search
None
See application file for complete search history.

(56) References Cited

PUBLICATIONS

Moshkina, Lilia V., An integrative framework of time-varying affective robotic behavior, Apr. 4, 2011, Georgia Institute of Technology, http://www.cc.gatech.edu/ai/robot-lab/online-publications/MoshkinaDissertationFinal.pdf.*
Ho Seok Ahn ; Seoul Nat. Univ., Seoul ; Jin Young Choi , Emotional Behavior Decision Model Based on Linear Dynamic Systems for Intelligent Service Robots , Aug. 26-29, 2007 , Robot and Human interactive Communication, 2007. RO-MAN 2007. The 16th IEEE International Symposium on, http://ieeexplore.ieee.org/stamp/stamp.jsp?tp=&arnumber=4415192.*

* cited by examiner

*Primary Examiner* — Kakali Chaki
*Assistant Examiner* — Viker Lamardo
(74) *Attorney, Agent, or Firm* — Novick, Kim & Lee, PLLC; Jae Youn Kim (57) ABSTRACT

An apparatus and method for calculating an internal state for artificial emotions are disclosed, of which the method comprises multiplying an input value obtained from a sensor with a first personality set in accordance with at least one low rank element contained in at least one high rank element of a NEO PI-R (Revised NEO Personality Inventory); calculating a personality factor value in a Five-Factor Model of the personality by adding the results of the multiplication; and calculating the internal state by multiplying the personality factor value with a second personality.

9 Claims, 7 Drawing Sheets

APPARATUS AND METHOD FOR CALCULATING INTERNAL STATE FOR ARTIFICIAL EMOTION

BACKGROUND OF THE INVENTION

1. Field of the Invention

The present invention relates to an apparatus and a method for calculating an internal state for an artificial emotion based on a generative probability model, and particularly an apparatus and a method for calculating an internal state which becomes a basis when expressing the emotions of a robot in different ways.

2. Description of Related Art

Most intelligent life has emotions, of which a human being can express the most varied and complicated. The emotion mechanism of a human being is directed to expressing a physical state based on a recognition function and a physical state of each instant moment as well as a spiritual state. For handling an emotional facet of a human being's behavior, many scientists are trying to research into emotional communication and communication between a human being and a robot and imitate an emotion mechanism of a human being for the purpose of designing a robot emotion system.

The emotions of a robot can be externally expressed by way of the motions of eyes, mouth, ears, gestures, etc., and a signal controlling such a motion is formed from information which helps properly move devices which can be movable in the robot. For example, the above mentioned information is on how great an angle a mouth can move at and how far an eyelid has moved.

The control signal should be configured to match the emotion of a robot. For example, when a control signal corresponding to a sorrow emotion is actually adapted when the emotion of a robot means fun, such emotional expression in this case does not actually match.

Even when the emotions of a robot and a control signal are properly mapped, a conventional art is simply directed to expressing a previously set simple emotion in accordance with an external input transmitted to a robot. For example, when an external input is transmitted to a robot, for example a signal related to touching gently on the head of robot is transmitted, the robot claps its hands for expressing a previously set fun emotion. When the head of robot is touched gently again, the robot only expresses the same emotions.

In other words, the robot of the conventional art can express the same emotions all the time when the robot is exposed to the same external conditions unlike a human being who expresses emotions in different ways depending on the internal states, in other words, the personalities or depending on the current internal situations even when the same external inputs are transmitted, so the robot cannot be made to fully express the emotions in the emotion mechanism of the human being.

SUMMARY OF THE INVENTION

Accordingly, it is an object of the present invention to provide an apparatus and a method for calculating an internal state for the purpose of expressing the emotion of a robot in different ways. It is another object of the present invention to provide an apparatus and a method for calculating an internal state of a robot which expresses the emotions in different ways in such a way to generate different internal states unlike the conventional emotion expression technology in which only the simple emotion expression is possible because an emotion and an expression method of it are mapped at 1:1.

To achieve the above objects, there is provided a method for calculating an internal state for artificial emotions, comprising multiplying an input value obtained from a sensor with a first personality set in accordance with at least one low rank element contained in at least one high rank element of a NEO PI-R (Revised NEO Personality Inventory); calculating a personality factor value in a Five-Factor Model of the personality by adding the results of the multiplication; and calculating the internal state by multiplying the personal factor value with a second personality.

In addition, the first personality is a value representing a stimulation reception degree with respect to an external input, and the second personality is a value representing a sensitivity degree of each personality factor in the five-factor model of the personality.

In addition, the first personality is a value representing a stimulation reception degree by the low rank elements with respect to an external input.

In addition, there is further provided calculating the current internal state value by adding the values obtained by multiplying the personality factor value with the second personality and the values obtained by multiplying the just previous internal state value with a third personality.

In addition, the third personality is a value representing a durability of the previous internal states.

In addition, the high rank element based on the NEO PI-R in the multiplication step is calculated from the following equation:

$$f(k) = \Gamma u(k)$$

where $\Gamma$ means a matrix of $x \times z$ where the first personality $\gamma$ expressed in numbers is arranged on a diagonal line,
x means the number of low rank elements,
z means the number of external input values,
u(k) means a matrix of $z \times 1$ representing an external input value, and
k means a sampling time.

In addition, the personality factor value of the personality factor value calculation step is calculated from the following equation:

$$g(k) = 1_x^T f(k)$$

where $1_x^T$ is a transposed matrix of a matrix of $x \times 1$ filled with 1.

In addition, the current internal state value of the personality factor value calculation step is calculated from the following equation:

$$y(k) = \beta g(k) + \alpha y(k-1)$$

where $\beta$ means a second personality expressed in numbers,
$\alpha$ means a third personality expressed in numbers, and
k−1 means the just previous sampling time.

To achieve the above objects, there is provided an apparatus for calculating an internal state for artificial emotions, comprising a stimulation reception part which is configured to multiply an input value obtained from a sensor with a first personality set in accordance with at least one low rank element contained in at least one high rank element of a NEO PI-R (Revised NEO Personality Inventory); and a personality calculation part which is configured to calculate each personality factor value in a Five Factor Model of a personality by adding the result values of the multiplications of the stimulation reception part and to calculate an internal state by multiplying the personality factor value with a second personality.

In addition, the first personality is a value representing a stimulation reception degree with respect to an external input, and the second personality is a value representing a sensitivity degree of each personality factor in the five-factor model of the personality.

In addition, the first personality is a value representing a stimulation reception degree by the low rank elements with respect to an external input.

In addition, there is further provided an internal state compensation part which is configured to calculate the current internal state value by adding a value obtained from the personality calculation part and a value obtained by multiplying the just previous internal state value with a third personality.

In addition, the third personality is a value representing a durability of the previous internal states.

In addition, the high rank element based on the NEO PI-R in the multiplication step is calculated from the following equation:

$$f(k)=\Gamma u(k)$$

where $\Gamma$ means a matrix of x×z where the first personality $\gamma$ expressed in numbers is arranged on a diagonal line,
x means the number of low rank elements,
z means the number of external input values,
u(k) means a matrix of z×1 representing an external input value, and
k means a sampling time.

The personality factor value of the personality factor value calculation step is calculated from the following equation:

$$g(k)=1_x^T f(k)$$

where $1_x^T$ is a transposed matrix of a matrix of x×1 filled with 1 and x means the number of the low rank elements.

In addition, the current internal state value of the personality factor value calculation step is calculated from the following equation:

$$y(k)=\beta g(k)+\alpha y(k-1)$$

where $\beta$ means a second personality expressed in numbers,
$\alpha$ means a third personality expressed in numbers, and
k−1 means the just previous sampling time.

To achieve the above objects, there is provided a computer-readable recording medium wherein an internal state calculation method of any one of claims 1 to 9 is recorded in a form of programs.

Advantageous Effects

According to the method and apparatus for calculating the internal states, various types of internal states can be provided for the purpose of expressing the emotions in different ways, so the robot can be made to express delicate and real emotions like a human being.

DESCRIPTION OF SPECIFIC EMBODIMENTS

The preferred embodiments of the present invention will be described with reference to the accompanying drawings to the extent that an ordinary person skilled in the art in the same field can implement.

Figure 1A:
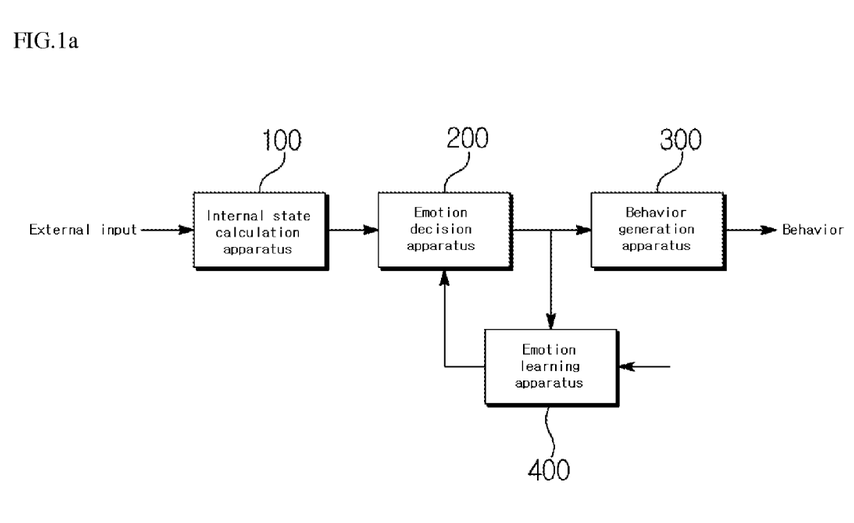
FIGS. 1a and 1b are views illustrating a construction of an artificial emotion learning apparatus according to the present invention.
Figure 1B:
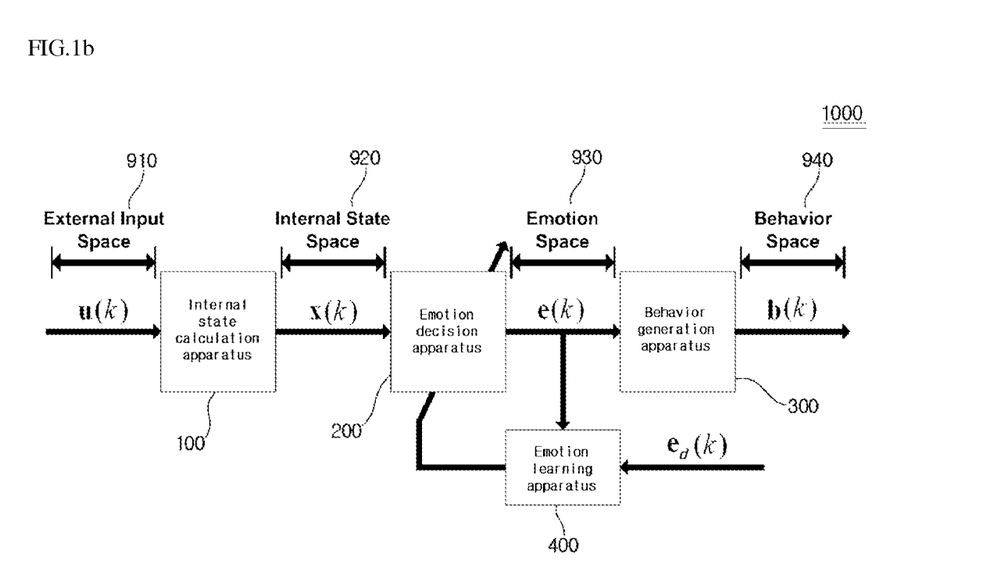

FIGS. 1a and 1b are views illustrating a construction of an artificial emotion learning apparatus 1000 using a generative probability model according to the present invention.

First of all, referring to FIGS. 1a and 1b, the whole constructions of the artificial emotion learning apparatus 1000 will be described, and then the method and apparatus for generating internal states according to the present invention will be described.

As shown in FIGS. 1a and 1b, the artificial emotion learning apparatus 1000 comprises four spaces for an artificial emotion learning based on a generative probability model: an external input space 910, an internal state space 920, an emotion space 930, and a behavior space 940; and four apparatuses for performing a mapping process, etc: an internal state calculation apparatus 100, an emotion decision apparatus 200, an behavior generation apparatus 300 and an emotion learning apparatus 400.

First of all, the external input signal 910 is formed of a vector space using externally detected information such as a facial expression, a gesture, a way of talking, etc.

The internal state space 920 is formed in the five-factor model; the five factors are openness to experience, conscientiousness, an extraversion, an agreeableness and neuroticism.

The internal state space is a concept for the purpose of constructing an internal state in order for a robot having a personality and an emotion to be implemented by the present invention to react against a specific external input. In more details, though there is the same external input or stimulation is presented, each human being has different reactions, in other words, different generative emotions depending on the background or environment that the human being has grown under. The emotion of it can be externally expressed based on the different personalities: the internal state.

For example, when the external stimulations of the same levels influenced a human being who was exposed to a violent environment for a long time and a human being who was not exposed to such environment, the former human being might have a certain internal state, specifically, a very delicate personality, so an emotion might be generated based on the thusly generated internal states, and the later human being might not have such an emotion.

The emotion space 930 is formed of a vector space based on the levels of an emotion such as happiness, surprise, sadness, love, hate, fear, anger, etc.

The behavior space 940 is formed of a vector space based on the degree of the unit behavior which indicates the smallest behavior such as a smiling mouth, a mouth opening, etc. of each emotion expression organs such as a mouth, eyes, a head, etc.

The internal state calculation apparatus 100 of FIGS. 1a and 1b is configured to calculate the internal states as an internal process and to map the internal state space 920 from the external input space 910 and to define the internal state space 920 and the dimensions. Here, the internal state means one dot in the internal state space 920 that uses the external inputs.

The internal state space 920 in the conventional art seems to be randomly changed though it is generated from a result of the psychological study. Since a result of the internal process corresponds to one dot in the internal state space 920, the internal process should be related with the state space; however there is a problem that the internal process is randomly connected with the internal state space based on a user's experience.

In order to improve the above mentioned problems, the present invention is directed to construct the internal state space 920 based on the five-factor model which comes from the personalities of the psychological study. The five-factor model was introduced so as to explain the personalities of a human being in a psychological way. The above mentioned model is well known to an ordinary person skilled in the art, so the detailed descriptions thereof will be omitted.

The internal process might be constructed using a NEO PI-R (the Revised NEO Personality Inventory) which is a measuring method of the five-factor model. The NEO PI-R will be described as follows.

The emotion decision apparatus 200 of FIGS. 1a and 1b is directed to an Emotion Decision Process while selecting an emotion vector which is mapped from the internal state space 920 to the emotion space 930.

In the conventional art, since the internal state space 920 is assigned with a plurality of fixed sections which serve to classify the emotions, it is hard to reflect the difference of ages or cultural backgrounds. In addition, there is a problem that each psychological study has different definitions and numbers of emotions.

However, the present invention is directed to setting an emotion probability method using GMM (Gaussian Mixture Model) in the emotion space and to updating the emotion probability method based on a user's feedback. Different from the method of selecting only one emotion in a simple way, the present invention is directed to selecting an emotion vector by way of the probability values distributed to all the emotions.

The behavior generation apparatus 300 of FIGS. 1a and 1b is directed to a Behavior Generation Process and is directed to mapping from an emotion space 930 to a behavior space 940 so as to generate a robot's behavior.

In the conventional art, the robot's behaviors or operations are selected using a 1:1 mapping model which is previously determined between the behavior and the emotion. So, when the same external inputs, etc. are given, the robot expresses the same behaviors all the time. Since one generated behavior reflects one emotion, the robot can express only simply behaviors. The present invention is directed to introducing a concept of a behavior generation process so as to generate behaviors in different ways in consideration with the unit behavior and probability emotion values so as to determine the behavior which has the highest probability in the robot.

Hereinafter, the internal state generation in the emotion decision process based on the generative probability model will be described.

As shown in FIGS. 1a and 1b in relation with the internal state generation, the artificial emotion learning apparatus 1000 using the generative probability model according to the present invention comprises two processes called an internal process and an emotion decision process with a learning scheme, respectively.

The internal process helps map the external input space 910 to the internal state space 920, and an internal state is generated as one point which resides in the internal state space 920. The internal process performs modeling using the NEO PI-R (Revised NEO Personality Inventory) which is a method developed so as to measure the five-factor model of the personality.

The above mentioned five-factor model is directed to a model which describes the personality of an individual and includes the personalities in five facets used so as to describe the personality of an individual. The five factors are openness to experience, conscientiousness, extraversion, agreeableness and neuroticism.

In addition, the NEO PI-R is a psychological personality measuring method and is used as a measuring method of the five factors of the personality. The NEO PI-R test includes the six low rank elements (facets) called the facet of each factor of the five-factor model of the personality and is provided to measure them.

The NEO PI-R consists of the six low rank elements per high rank element.

Openness to experience: fantasy, aesthetics, feelings, actions, ideas, values

Conscientiousness: competence, order, dutifulness, achievement striving, self-discipline, deliberation Extraversion: warmth, gregariousness, assertiveness, activity, excitement seeking, positive emotion Agreeableness: trust, straightforwardness, altruism, compliance, modesty, tender mindedness Neuroticism: anxiety, hostility, depression, self-consciousness, impulsiveness, vulnerability to stress As shown in FIGS. 1a and 1b, $u(k)$ is designed as an external input vector, and the elements of the above mentioned external input vector indicate the external input states such as a face expression, a gesture and a way of speaking, etc. In addition, the external input vector is present in the S-dimensional external input space 910 with S numbers of external inputs.

$x(k)$ can be defined as the internal state vector, and the elements of the internal state vector represent the states of five factors: openness to experience, conscientiousness, extraversion, agreeableness and neuroticism.

$u(k)$ becomes the input of the internal process, and $x(k)$ becomes the output of the internal process. If there is not an external input for a certain time long, the internal state converges to zero where the emotion state is neutral.

The emotion decision process is a process for the purpose of mapping from the internal state space 920 to the emotion space 930 and serves to generate an emotion vector which corresponds to one point positioning in the emotion space 930. In the present invention, it is configured to set an emotion probability distribution which is distributed in the internal state space 920 and to update the emotion probability distribution through the learning.

$e(k)$ can be defined as an emotion vector, and the element forming the emotion vector represents the dimension of the probability of the emotion that the element indicates. The emotion space 930 might be a J-dimension where J represents the number of emotions.

$x(k)$ becomes the input of the emotion decision process, and $e(k)$ becomes the output of the emotion decision process. When $x(k)$ is inputted into the emotion decision process, each emotion probability is decided using the emotion probability distribution which is distributed in the internal state space 920, and $e(k)$ is decided to have a certain probability with respect to all the emotions.

Hereinafter the internal process will be described in details.

Figure 2A:
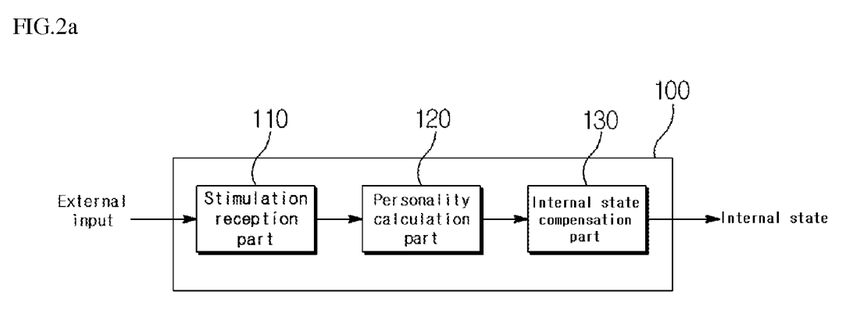
FIGS. 2a to FIG. 2c are views illustrating a method and an apparatus for calculating interval states according to the present invention.
Figure 2B:
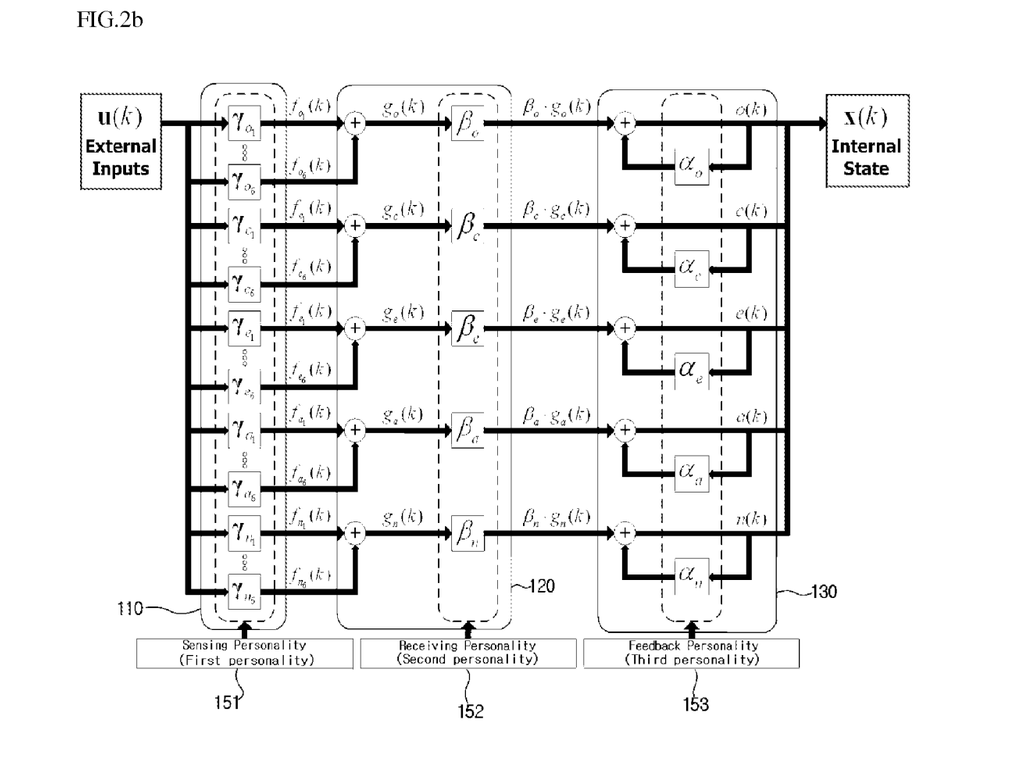
Figure 2C:
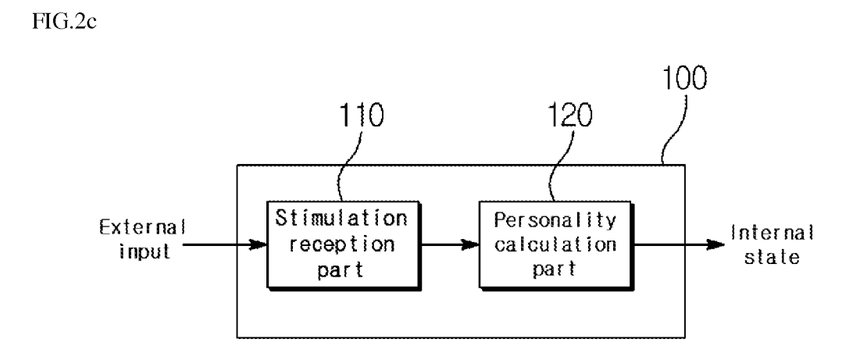

FIGS. 2a and 2b are views explaining the concepts of the method and apparatus for calculating the internal states according to the present invention.

In more details, FIGS. 2a and 2b are views illustrating the internal process which uses NEO PI-R, and the process of FIGS. 2a and 2b is modeled using the NEO PI-R which is a method for measuring the five-factor model of the personality which is used in the internal state space 920.

As shown in FIGS. 2a and 2b, the internal state calculation is conducted in an order of the facet value vector calculation on the factors of the personality, the factor valve calculation of the personality and the internal state calculation.

As shown in FIGS. 2a and 2b, $u(k) \in \{0, 1\}^S$ is decided depending on the external input where S represents the number of external inputs. The value of the i-th element in $u(k)$ represents whether the i-th sensor operates or not, and when it is in operation, the value is 1, otherwise the value is 0, provided that $i \in \{1, 2, \ldots, S\}$.

Here the input vector is processed by the dynamic system which has three kinds of personality parameters.

Facet parameter (151, first personality): $\Gamma_o$, $\Gamma_c$, $\Gamma_e$, $\Gamma_a$, $\Gamma_n \in R^{6 \times s}$ Personality factor parameter (152, second personality): $\beta_o$, $\beta_c$, $\beta_e$, $\beta_a$, $\beta_n \in R$, Durability parameter (153, third personality): $\alpha_o$, $\alpha_c$, $\alpha_e$, $\alpha_a$, $\alpha_n \in [0,1]$ The lower case letters "o", "c", "e", "a", "n" in each parameter represent openness to experience, conscientiousness, extraversion, agreeableness and neuroticism, respectively.

The personality factor parameter (152, second personality) represents sensitivity level of each personality factor. The durability parameter (153, third personality) represents durability with respect to each personality factor based on the five-factor model of the personality.

The facet parameter represents the sensitivity degree of the six low rank elements included in each personality factor. The facet parameter (151, first personality) might be totally 30 in number since the five personality factors each include six low rank elements.

For example, the facet parameter (151, first personality) with respect to the openness to experience which is one of the personality factors might be expressed as follows.

$\Gamma_o = [\gamma_{o1}, \gamma_{o2}, \gamma_{o3}, \gamma_{o4}, \gamma_{o5}, \gamma_{o6}]^T$, and $\gamma_{o1}, \gamma_{o2}, \gamma_{o3}, \gamma_{o4}, \gamma_{o5}, \gamma_{o6} \in R^s$.

The facet parameters (151, first personality) of the other four factors can be expressed in the same way.

Next, in relation with the facet value vector calculation with respect to the factor of the personality, the input vector values are converted into the five-factor facet value vectors using the facet parameter corresponding to it: openness to experience, conscientiousness, extraversion, agreeableness and neuroticism.

For example, $f_o(k)$ (provided that, $f_o(k) \in R^6$) of the facet value vectors with respect to the openness to experience can be decided as follows.

$f_o(k) = \gamma_o u(k)$, and $f_o(k) = [f_{o1}(k), f_{o2}(k), f_{o3}(k), f_{o4}(k), f_{o5}(k), f_{o6}(k)]^T$.

$f_c(k)$, $f_e(k)$, $f_a(k)$, $f_n(k)$ of the facet value vector of other four personality factors can be decided in the same way.

Next, in relation with the calculation of the personality factor value, the facet value vector can be calculated to the personality factor value in such a way to sum six facet values.

For example, $g_o(k)$ (provided that, $g_o(k) \in R$) of the factor value with respect to the openness to experience can be decided as follows.

$g_o(k) = 1_6^T f_o = 1_6^T \Gamma_o u(k)$, and $1_6$ is the vector 6×1 filled with 1.

$g_c(k)$, $g_e(k)$, $g_a(k)$ and $g_n(k)$ which are the values with respect to other four personality factors can be decided in the same way.

Finally, in relation with the internal state calculation, it is converted into the internal state value using the durability parameter, the personality factor parameter and the past internal state value.

For example, $o(k+1)$ with respect to openness to experience can be decided by the state equation below.

$o(k+1) = \alpha_o o(k) + \beta_o g_o(k)$ $c(k+1)$, $e(k+1)$, $a(k+1)$, $n(k+1)$ can be decided in the same way.

In other words, the current internal state values can be calculated in such a way to add the values obtained by multiplying $\beta_o$, $g_o(k)$ which the currently calculated personality factor value with $\alpha_o$ which is the durability parameter representing the durability of the internal state.

In relation with the whole internal state values, the whole internal state dynamics can be expressed in the following state equation.

$$x(k+1) = Ax(k) + Bu(k) \quad \text{[Equation 1]}$$
$$x(k) = [\, o(k) \quad c(k) \quad e(k) \quad a(k) \quad n(k)\,]^T \in R^5$$

$$A = \begin{bmatrix} \alpha_O & 0 & 0 & 0 & 0 \\ 0 & \alpha_C & 0 & 0 & 0 \\ 0 & 0 & \alpha_E & 0 & 0 \\ 0 & 0 & 0 & \alpha_A & 0 \\ 0 & 0 & 0 & 0 & \alpha_N \end{bmatrix} \in R^{5 \times 5}$$

$$B = \begin{bmatrix} \beta_o \, 1_6^T \, \Gamma_o \\ \beta_c \, 1_6^T \, \Gamma_o \\ \beta_e \, 1_6^T \, \Gamma_o \\ \beta_a \, 1_6^T \, \Gamma_o \\ \beta_n \, 1_6^T \, \Gamma_o \end{bmatrix} \in R^{5 \times S} \quad \text{[Equation 2]}$$

In addition, there is no limit in using all the high rank elements based on NEO PI-R, and at least two high rank elements might be used if necessary. It does not need to use all the six low rank elements contained in the high rank element. At least one high rank element might be used if necessary. In this case, the dimensional value of the internal state might change.

Hereinafter the internal state calculation method according to an embodiment of the present invention will be described.

Figure 3A:
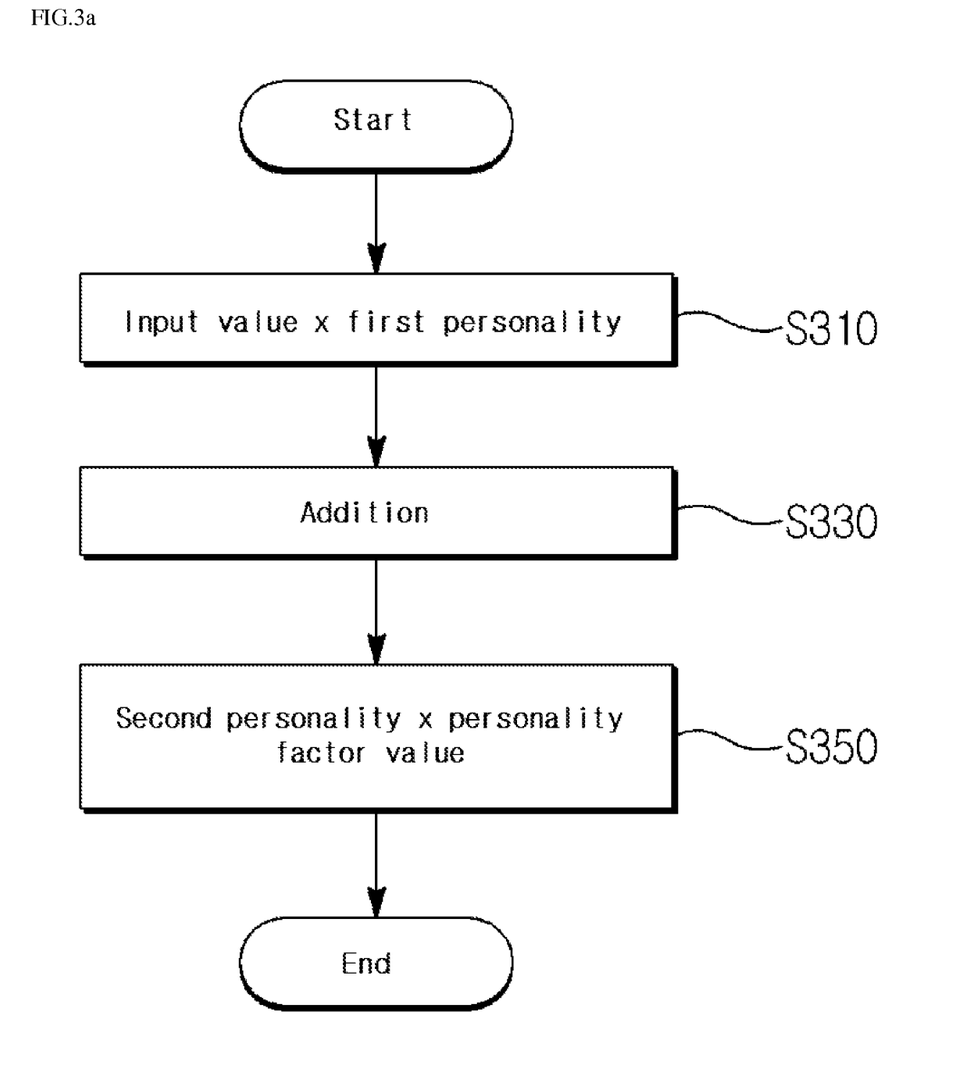
FIGS. 3a and 3b are flow charts of a method for calculating internal states according to the present invention.
Figure 3B:
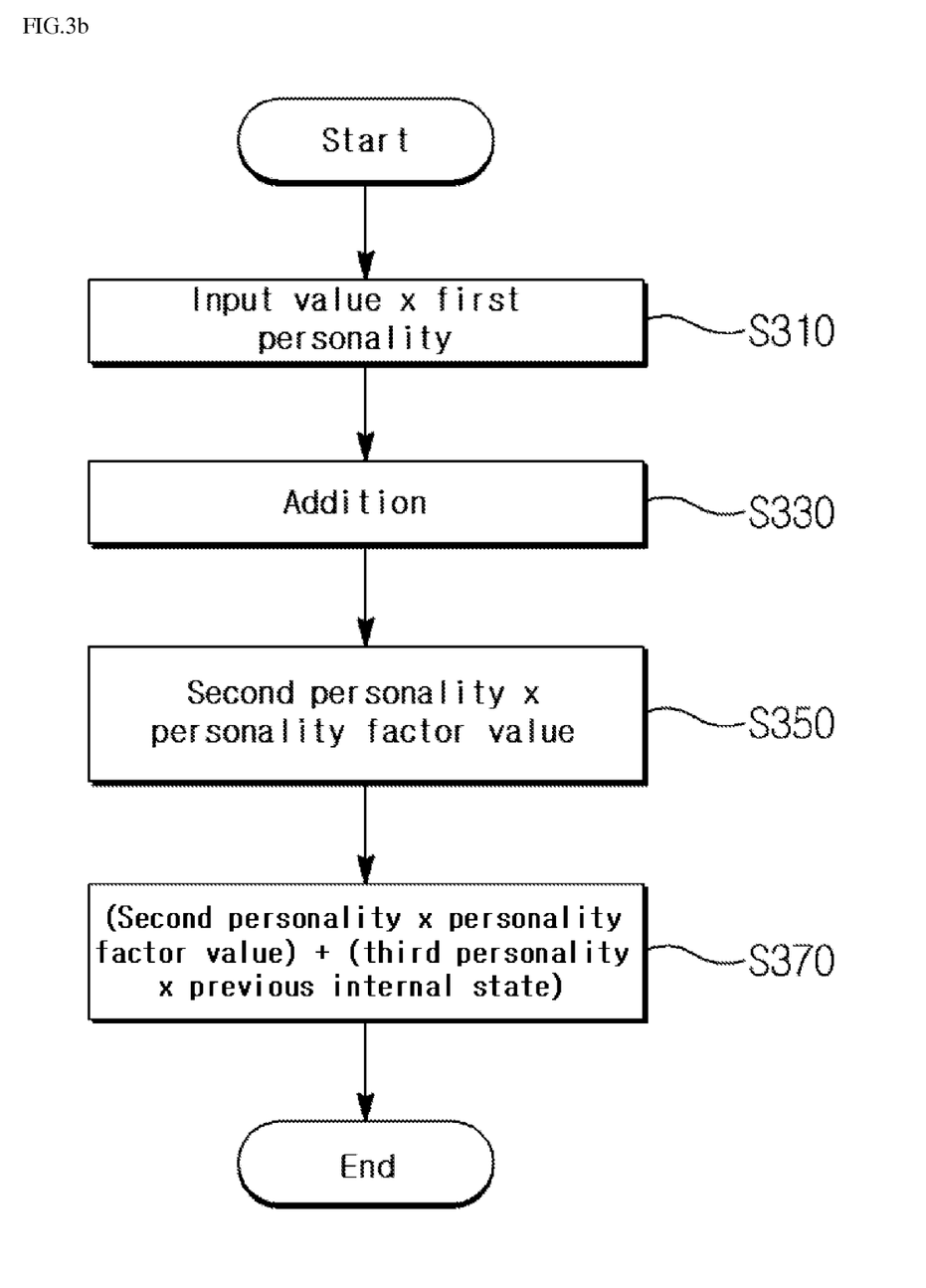

FIG. 3 is a flow chart of an internal state calculation method according to the present invention.

As shown in FIG. 3, the facet parameter 151 (first personality) generated depending on each low rank element contained in the high rank element of NEO PI-R is multiplied with the input value obtained from the external sensor (S310).

First personality 151 means the facet parameter, and the facet parameter represents the degree of the six facets included in the five personality factors. So the stimulation reception degrees by the low rank elements can be figured out. The stimulation reception degree by the low rank elements can be defined with the following parameters.

Openness to experience: γo1, γo2, γo3, γo4, γo5, γo6
Conscientiousness: γc1, γc2, γc3, γc4, γc5, γc6
Extraversion: γe1, γe2, γe3, γe4, γe5, γe6
Agreeableness: γa1, γa2, γa3, γa4, γa5, γa6
Neuroticism: γn1, γn2, γn3, γn4, γn5, γn6

Afterward, the results of the multiplication are summed for thereby calculating the personality factor values which are the stimulation reception values (S330). The stimulation reception degrees recognized by the low rank elements by way of the behavior conducted in the previous step are gathered, and ($g_o(k)$, $g_c(k)$, $g_e(k)$, $g_a(k)$, $g_n(k)$) of the personality factor values each representing the high rank element are recognized.

The personality factor values are multiplied with the personality factor parameter 152 (second personality) (S350). The personality factor parameter 152 (second personality) corresponds to the previously mentioned personality factor parameter. Here the personality factor parameter represents the sensitivity degree with respect to the five personality factors. In other words, it might be interpreted as the degree that the personality can endure with respect to the external input.

Finally, the values obtained by multiplying the personality factor value obtained in the previous step with the personality factor parameter 152 (second personality) is added to the just previous internal state value to which the durability parameter 153 is multiplied, thus calculating x(k) which means the current internal state (S370). The durability parameter 153 (third personality) is the previously described durability parameter and represents the degree to which the five personality factor values become durable.

The current internal state can be calculated over the step S370 by deciding how much the past internal states are reflected at this moment.

Hereinafter the internal state calculation apparatus 100 according to an embodiment of the present invention will be described.

The internal state calculation apparatus 100 consists of a stimulation reception part 110, a personality calculation part 120 and an internal state compensation part 130.

The stimulation reception part 110 is configured to multiply the input value obtained from the sensor with the first personality set in accordance with at least one low rank element contained in at least one high rank element of NEO PI-R (Revised NEO Personality Inventory).

The personality calculation part 120 is configured to calculate each personality factor value in the five-factor model of the personality by adding the results of the multiplications of the stimulation reception part and to calculate the internal states by multiplying the personality factor value with the second personality.

The internal state compensation part 130 is configured to calculate the current internal state values by adding the values obtained from the personality calculation part and the value obtained by multiplying the just previous internal state value with the third personality.

Meanwhile, there might be further provided after the step of calculating the internal state a step for transmitting the current emotion value to the emotion indication part (not shown) which has the mapped motion of the robot who expressed emotions depending on the internal states.

In other words, the emotions can be calculated using the generative probability model in the emotion decision apparatus 20 depending on the internal states obtained by way of the internal state calculation apparatus 100. So as to express the emotions, the behavior generation apparatus 300 calculates a control degree, etc. in order to control the motions of an expression organ such as a mouth, eyelids, etc. and enables each expression organ of the robot to operate.

The above described emotion value calculation method might be recorded a computer-readable recording medium in a form of problems.

While the present invention has been described with respect to the specific embodiments, it will be apparent to those skilled in the art that various changes and modifications may be made without departing from the spirit and scope of the invention as defined in the following claims.

What is claimed is:

1. A method for calculating a current internal state value for artificial emotions, the method comprising:
    obtaining at least one facet value vector by multiplying an input value obtained from a sensor with a first personality set in accordance with at least one low rank element contained in at least one high rank element of a NEO PI-R (Revised NEO Personality Inventory);
    adding up the at least one facet value vector so as to calculate a personality factor value in a Five-Factor Model of personality;
    multiplying the personal factor value with a second personality; and
    calculating the current internal state value by adding one or more values obtained by multiplying the personality factor value with the second personality and one or more values obtained by multiplying the just previous internal state value with a third personality,
    wherein the at least one facet value vector based on the NEO PI-R is calculated from the following equation:

$$f(k) = \Gamma u(k)$$

where $\Gamma$ means a matrix of x×z where the first personality γ expressed in numbers is arranged on a diagonal line,
    x means the number of low rank elements,
    z means the number of external input values,
    u(k) means a matrix of z×1 representing an external input value,
    k means a sampling time
    wherein the personality factor value of the personality factor value calculation step is calculated from the following equation:

$$g(k) = 1_x^T f(k),$$

where $1_x^T$ is a transposed matrix of a matrix of x×1 filled with 1, and
    wherein the current internal state value of the personality factor value calculation step is calculated from the following equation:

$$y(k) = \beta g(k) + \alpha y(k-1),$$

where β means the second personality expressed in numbers,
    α means the third personality expressed in numbers, and
    k−1 means the just previous sampling time.

2. The method of claim 1, wherein the first personality is a value representing a stimulation reception degree with respect to an external input, and the second personality is a value representing a sensitivity degree of each personality factor in the five-factor model of the personality.

3. The method of claim 2, wherein the first personality represents the stimulation reception degree by the at least one low rank element with respect to the external input.

4. The method of claim 1, wherein the third personality is a value representing a durability of previous internal states.

5. An apparatus for calculating a current internal state value for artificial emotions, comprising:
    a stimulation reception part which is configured to multiply an input value obtained from a sensor with a first personality set in accordance with at least one low rank element contained in at least one high rank element of a NEO PI-R (Revised NEO Personality Inventory) so as to obtain at least one facet value vector;
    a personality calculation part which is configured to calculate each personality factor value in a Five Factor Model of personality by adding up the least one facet value vector and to multiply the personality factor value with a second personality; and
    an internal state compensation part which is configured to calculate the current internal state value by adding one or more values obtained by multiplying the personality factor value with the second personality and one or more values obtained by multiplying the just previous internal state value with a third personality, wherein the at least one facet value vector based on the NEO PI-R is calculated from the following equation:

$$f(k)=\Gamma u(k)$$

where $\Gamma$ means a matrix of x×z where the first personality $\gamma$ expressed in numbers is arranged on a diagonal line,
x means the number of low rank elements,
z means the number of external input values,
u(k) means a matrix of z×1 representing an external input value, and
k means a sampling time,
wherein the personality factor value of the personality factor value calculation step is calculated from the following equation:

$$g(k)=1_x^T f(k),$$

where $1_x^T$ is a transposed matrix of a matrix of x×1, filled with 1, and
x means the number of the low rank element, and
wherein the current internal state value of the personality factor value calculation step is calculated from the following equation:

$$y(k)=\beta g(k)+\alpha y(k-1),$$

where $\beta$ means the second personality expressed in numbers,
$\alpha$ means the third personality expressed in numbers, and
k−1 means the just previous sampling time.

6. The apparatus of claim 5, wherein the first personality is a value representing a stimulation reception degree with respect to an external input, and the second personality is a value representing a sensitivity degree of each personality factor in the five-factor model of the personality.

7. The apparatus of claim 6, wherein the first personality represents the stimulation reception degree by the at least one low rank element with respect to the external input.

8. The apparatus of claim 5, wherein the third personality is a value representing a durability of previous internal states.

9. A non-transitory computer-readable recording medium, wherein the internal state calculation method of claim 1 is recorded in a form of programs.

* * * * *